United States Patent
Wu et al.

(10) Patent No.: US 6,780,966 B2
(45) Date of Patent: Aug. 24, 2004

(54) COAGULATION PROCESS OF PTFE FINE POWDERS

(75) Inventors: Hua Wu, Milan (IT); Stefano Ferrero, Alessandria (IT)

(73) Assignee: Ausimont S.p.A., Milan (IT)

( * ) Notice: Subject to any disclaimer, the term of this patent is extended or adjusted under 35 U.S.C. 154(b) by 0 days.

(21) Appl. No.: 10/202,851

(22) Filed: Jul. 26, 2002

(65) Prior Publication Data

US 2003/0060597 A1 Mar. 27, 2003

(30) Foreign Application Priority Data

Jul. 26, 2001 (IT) ..................... MI2001A1613

(51) Int. Cl.$^7$ .................................. C08J 3/00
(52) U.S. Cl. ............... 528/502 F; 528/480; 528/481; 528/502 R; 524/545
(58) Field of Search ............. 528/502 F, 480, 528/481, 502 R; 524/545

(56) References Cited

U.S. PATENT DOCUMENTS

| | | | |
|---|---|---|---|
| 3,046,263 A | | 7/1962 | Whitlock et al. ......... 260/92.1 |
| RE30,378 E | * | 8/1980 | Bice et al. ............... 528/486 |
| 4,408,007 A | * | 10/1983 | Kuhls et al. .............. 524/546 |
| 4,990,283 A | * | 2/1991 | Visca et al. ............... 516/30 |
| 5,077,359 A | * | 12/1991 | Moore ..................... 526/206 |
| 5,463,021 A | * | 10/1995 | Beyer et al. .............. 528/482 |
| 5,747,640 A | * | 5/1998 | Higuchi et al. ......... 528/502 F |
| 5,977,295 A | | 11/1999 | Higuchi et al. ............ 528/502 |
| 6,593,416 B2 | * | 7/2003 | Grootaert et al. .......... 524/545 |

FOREIGN PATENT DOCUMENTS

| | | |
|---|---|---|
| EP | 0 798 333 A1 | 10/1997 |
| JP | 06234864 | 8/1994 |

* cited by examiner

*Primary Examiner*—David W. Wu
*Assistant Examiner*—Henry S Hu
(74) *Attorney, Agent, or Firm*—Arent Fox PLLC

(57) ABSTRACT

A continuous coagulation process of PTFE or modified PTFE fine powders, comprising:

Figure 1:
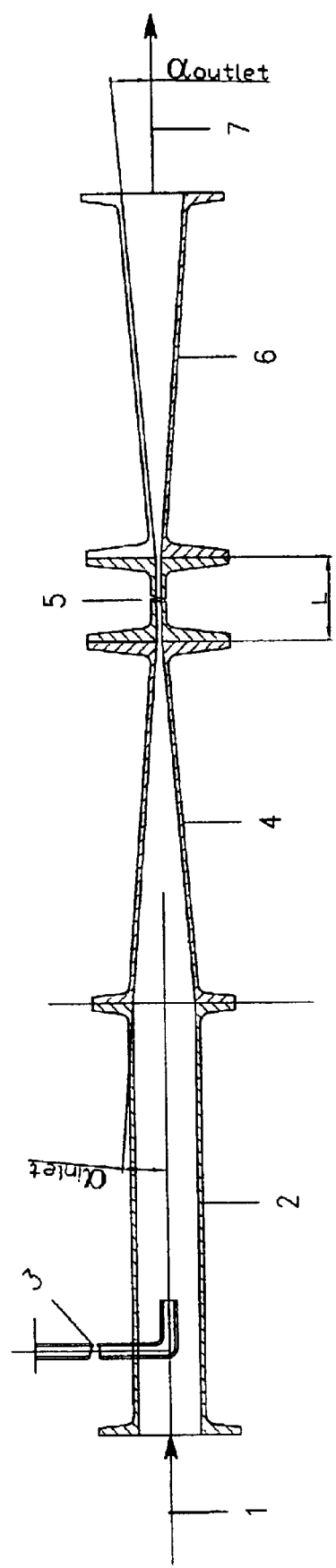

a1) dilution in a lift of a PTFE latex up to a concentration from 5 to 25% w/w of PTFE, and optional filtration of the obtained diluted latex, b1) latex pressurization in the lift by an inert gas, preferably air, until a relative pressure, related to the atmospheric pressure, in the range 3–40 kg/cm$^2$ (0.3–4 MPa), c1) addition of an acid electrolyte solution, d1) latex flowing from the mixer through a capillary tube under turbulent flow conditions, e1) granulation (coagulation) of the gel obtained in step d1) by mechanical stirring with a specific power from 1.5 to 10 kW/m$^3$, maintaining the stirring until fine powder flotation, f1) separation of the underlying water from the fine powder.

10 Claims, 1 Drawing Sheet

COAGULATION PROCESS OF PTFE FINE POWDERS

The present invention relates to a continuous coagulation process of polytetrafluoroethylene (PTFE) prepared by a polymerization process in dispersion or emulsion, to obtain wet fine powders of non thermoprocessable PTFE (or modified PTFE).

More specifically, the invention relates to a continuous coagulation process of PTFE fine powders, comprising the aggregation/gelification of the PTFE latex by a capillary tube, and subsequent granulation (coagulation) by mechanical stirring.

Non thermoprocessable fine powders of PTFE or modified PTFE obtained by the process of the present invention are characterized by a high apparent density, $\geq 470$ g/l, an average diameter ($D_{50}$) higher than 200 micron, preferably from 400 to 600 micron, and characterized by a narrow distribution of the particle diameters, said distribution, defined as a ratio between the weight of the particles having a diameter in the range 0.7–1.3 times the average diameter of the particles and the total weight of the polymer particles, being higher than 50%, preferably higher than or equal to 60%.

It is known in the prior art that PTFE fine powders are obtained by the polymerization in dispersion. In this process a sufficiently high surfactant amount is used so as to be able to stabilize the PTFE colloidal particles and a soft stirring is applied during the polymerization to avoid the polymer coagulation (precipitation). Subsequently the latex obtained from said process is coagulated and the powder obtained from the coagulation is called "fine powder". The conventional coagulation process comprises the following steps:

latex dilution with water, optionally addition of a destabilizing electrolyte, latex mechanical stirring to obtain the formation of aggregates/gels, granulation (coagulation) of the aggregates/gels by mechanical stirring, PTFE flotation from water, mechanical separation of the wet fine powder from the coagulum water.

Said PTFE fine powders are transformed by the lubricated extrusion process to obtain the manufactured articles.

The lubricated extrusion process is much more productive and easily automatizable the more the fine powders are flowing and have a high apparent density. Besides, the average particle diameter is preferably higher than 400 micron and the particle diameter distribution as above defined should be at least higher than 50%, preferably higher than or equal to 60% to obtain an improved flow.

Various processes to obtain fine powders, both in batch and in a continuous way, are known in the prior art. With the batch processes apparent densities of about 400 g/liter (see comparative Examples) or slightly higher are obtained and the particle average diameter ($D_{50}$) is in the desired range. However the fine powders show the drawback to have a particle diameter distribution as above defined lower than 50%, and therefore unsuitable. Another drawback of the batch processes is that from the industrial point of view they are more expensive than the continuous processes. It is known to the skilled that generally it is not possible to transform the batch processes to obtain PTFE fine powder in continuous processes.

In U.S. Pat. No. 3,046,263 a continuous coagulation process of the PTFE latexes is described, comprising the following steps:

phase of strong mechanical stirring of the polymerization latexes using a specific power of 1–100 CV×sec/gallon (196 kJ/m$^3$–19,600 kJ/m$^3$), preferably using a centrifugal pump with an average time of the latex residence in the pump of 2 seconds;

aggregate or gel formation by passing through a capillary tube having hydraulic resistance of 0.5–20 p.s.i. (~3.4–136 kPa);

granulation in the presence of air by mechanical stirring with specific power of 0.25–50 CV×sec/gallon (49 kJ/m$^3$–9,800 kJ/m$^3$);

subsequent separation of the PTFE fine powder from water.

The drawback of said process is that the capillary tube is easily obstructed whereby the process must be often interrupted to clean the capillary tube. Furthermore it has been found by the Applicant that also in the first phase of the latex preparation which must be introduced in the capillary tube for gelification, the partial formation of PTFE granules takes place causing the obstruction of the centrifugal pump. This is a further drawback of the above process.

Another continuous process which avoids the drawbacks of the process described in the previous patent is reported in U.S. Pat. No. 5,977,295. In said process a capillary tube is not used, since considered unsuitable for a continuous process due to the above drawbacks. The PTFE latex deriving from the polymerization in emulsion is fed to a high shear apparatus having rotating elements to obtain aggregates/gels (gel phase). The so obtained gel phase is fed to the coagulation phase in a column by applying shear forces to the gel phase. According to U.S. Pat. No. 5,977,295 by this process high apparent densities, a good average particle diameter are obtained, but the particle diameter distribution is not mentioned. The drawback of said process resides in that a very complicated and expensive high shear apparatus is used, which requires rotor peripherical rates of the order of 2 to 30 m/s and free space between stator and rotor of about 0.5 mm. This requires the water fluxing on the rotating parts for the correct working of the shear apparatus and of the process described therein. Besides, even though a so complicated apparatus is used, the shear is not perfectly uniform whereby it is not possible to obtain a narrow distribution of the particle diameters. This leads to the above drawbacks.

The need was felt to have available a continuous process for the preparation of wet PTFE fine powders, overcoming the drawbacks of the prior art and not requiring the use of complicated and expensive apparatus to obtain high shears to reduce the unhomogeneity of the obtained fine powders, and allowing to obtain PTFE fine powders having an improved flow and high apparent density and narrow distribution of the particle diameters, as above defined, higher than 50%, preferably higher than or equal to 60%.

An object of the present invention is a continuous coagulation process of PTFE or modified PTFE fine powders, comprising:

a1) dilution in a lift of a PTFE or modified PTFE latex obtained from the polymerization in dispersion (emulsion) up to a concentration from 5 to 25% w/w of PTFE, preferably from 8 to 20% w/w of PTFE or modified PTFE; and optional filtration of the obtained diluted latex, b1) latex pressurization in the lift by an inert gas, preferably air, until a relative pressure, referred to the atmospheric pressure, in the range 3–40 kg/cm$^2$ (0.3–4 MPa), preferably from 5 to 20 kg/cm$^2$ (0.5–2 MPa), and still more preferably from 7 to 15 kg/cm$^2$ (0.7–1.5 MPa), c1) addition of an acid electrolyte solution, preferably nitric acid, to the PTFE or modified PTFE latex, in a in-line mixer, so that the pH is from 1 to 4, preferably from 1.5 to 3; the latex concentration and the pH being such as not to cause the formation of aggregates/gels in the in-line mixer, d1) latex flowing from the mixer through a capillary tube under turbulent flow conditions, having a Reynolds number higher than 3,000, preferably higher than 5,000, e1) granulation (coagulation) of the gel obtained in step d1) by mechanical stirring with a specific power from 1.5 to 10 kW/m$^3$, maintaining the stirring until fine powder flotation, f1) separation of the underlying water from the wet fine powder.

In the step d1) to obtain turbulent flow conditions of the latex, one preferably works as follows:

the capillary tube has an internal diameter such that the total capillary tube hydraulic resistance under the process conditions causes a pressure fall between the capillary tube ends from 3 to 40 kg/cm$^2$ (0.3–4 MPa), preferably from 5 to 20 kg/cm$^2$ (0.5–2 MPa), and still more preferably from 7 to 15 kg/cm$^2$ (0.7–1.5 MPa), the capillary tube length is from 0.1 to 30 m, preferably from 0.3 to 15 m, and still more preferably from 1 to 10 m, the latex/gels rate inside the capillary tube is in the range 2–15 m/sec, the capillary tube diameter is generally from 2 to 20 mm, preferably from 3 to 10 mm.

In a preferred embodiment the capillary tube length ranges from 0.1 to 3 m, still better from 0.2 to 1 m.

The combination of the capillary tube diameter, the latex concentration, the electrolyte pH and the latex linear rate through the capillary tube, must be such as to guarantee a turbulent flow of the latex inside the capillary tube.

In step d1) aggregation/gelification takes place. The capillary tube length as above defined is such to guarantee a complete aggregation/gelification of the latex and the absence of formation of the fine powder granules inside the capillary tube.

In FIG. 1 it is reported a preferred embodiment of the apparatus comprising the capillary tube for obtaining, starting from the latex, a polymer gel. The numbers have the following meaning:

1 Inlet for the latex.
2 Mixing chamber.
3 Pipe for electrolyte feeding.
4 Convergent section of 2.
5 Capillary tube.
6 Divergent section.
7 Outlet for the gel.

The latex entering from 1 is mixed with the electrolyte coming from 3 in the mixing chamber 2. Then the latex mixed with the electrolyte in chamber 2, enters in section 4 connecting the mixing chamber 2 with the capillary tube 5. The angle of the profile of the convergent section 4 can be from about 5° to 15°, preferably of 10°. Then the latex mixture enters in the capillary tube 5, wherein gel formation takes place. The gel so formed passes to section 6. The angle of the profile of this section is not particularly limited, and in general ranges from 10° to 20°. The gel at the end of 6, through the outlet 7, goes into the granulation apparatus (step e1) of the process of the invention).

By aggregates/gels it is meant that the polymer particles are dipped in the liquid phase and linked by crossed bonds so to form a thick network. The aggregates/gels properties significantly depend on the interactions of said two components (polymer and liquid). The liquid prevents the polymer network from being transformed into a compact mass and the polymer network prevents the liquid from coming out from the aggregates/gels. Depending on the chemical composition and other factors the consistence of the aggregates/gels varies from fluids to rather stiff solids.

At the end of step b1), while the previously pressurized latex is discharged in the mixer of step c1), a second lift is used which is fed with latex to be diluted according to step a1). When the first lift has been emptied, the latex fed into the second lift is at the end of step b1), and therefore the latex is fed again in the first lift.

For step e1) one works for example with the columns described in the prior art to have a continuous process, for example vessels having a heigth/diameter ratio higher than 2, equipped with stirrer (see the processes described in the above patents).

The PTFE or modified PTFE fine powders obtained from the process of the present invention are particularly suitable to the transformation by lubricated extrusion to obtain manufactured articles.

By PTFE according to the present invention the TFE homopolymer is meant, by modified PTFE, TFE copolymers with one or more comonomers are meant, having at least one unsaturation of ethylene type in an amount from 0 to 3% by moles, preferably from 0.01 to 1% by moles.

The comonomers which can be used are of both hydrogenated and fluorinated type.

Among the hydrogenated comonomers, ethylene, propylene, acrylic monomers, for example methyl methacrylate, (meth)acrylic acid, butylacrylate, hydroxyethylhexylacrylate, styrene monomers, such for example styrene can be mentioned.

Among the fluorinated comonomers it can be mentioned:

$C_3$–$C_8$ perfluoroolefins, such as hexafluoropropene (HFP);

$C_2$–$C_8$ hydrogenated fluoroolefins, such as vinyl fluoride (VF), vinylidene fluoride (VDF), trifluoroethylene, hexafluoroisobutene, perfluoroalkylethylene $CH_2$=CH—$R_f$, wherein $R_f$ is a $C_1$–$C_6$ perfluoroalkyl;

$C_2$–$C_8$ chloro- and/or bromo- and/or iodo-fluoroolefins, such as chlorotrifluoroethylene (CTFE);

(per)fluoroalkylvinylethers (PAVE) $CF_2$=$CFOR_f$, wherein $R_f$ is a $C_1$–$C_6$ (per)fluoroalkyl, for example $CF_3$, $C_2F_5$, $C_3F_7$;

(per)fluorooxyalkylvinylethers $CF_2$=CFOX, wherein X is: a $C_1$–$C_{12}$ alkyl, or a $C_1$–$C_{12}$ oxyalkyl, or a $C_1$–$C_{12}$ (per)fluorooxyalkyl having one or more ether groups, for example, perfluoro-2-propoxy-propyl;

fluorodioxoles, preferably perfluorodioxoles;

non conjugated dienes of the type:

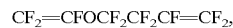

$CF_2$=$CFOCF_2CF_2CF$=$CF_2$, $CFX^1$=$CX^2OCX^3X^4OCX^2$=$CX^1F$ wherein $X^1$ and $X^2$, equal to or different from each other, are F, Cl or H; $X^3$ and $X^4$, equal to or different from each other, are F or $CF_3$, which during the polymerization cyclopolymerize;

fluorovinylethers (MOVE) of general formula:

$CFX_{AI}$=$CX_{AI}OCF_2OR_{AI}$ (A-I) wherein $R_{AI}$ is a $C_2$–$C_6$ linear, branched or $C_5$–$C_6$ cyclic (per)fluoroalkyl group, or a $C_2$–$C_6$ linear, branched (per)fluorooxyalkyl group, containing from one to three oxygen atoms;

when $R_{AI}$ is a fluoroalkyl or a fluorooxyalkyl group as above it can contain from 1 to 2 atoms, equal or different, selected from the following: H, Cl, Br, I; $X_{AI}$=F, H; the compounds of general formula: $CFX_{AI}=CX_{AI}OCF_2OCF_2CF_2Y_{AI}$ (A-II), wherein $Y_{AI}$=F, $OCF_3$; $X_{AI}$ as above are preferred; in particular (MOVE I) $CF_2$=$CFOCF_2OCF_2CF_3$ (A-III) and (MOVE II) $CF_2$=$CFOCF_2OCF_2CF_2OCF_3$ (A-IV) are preferred.

The continuous process of the present invention, as said, allows to obtain PTFE fine powders having a narrow distribution (as above) of the particle diameter, whereby the fine powders show an improved flow. This property is combined with a high apparent density and with an average diameter preferably higher than 400 micron.

The continuous process of the invention leads to fine powders with reproducible properties. In the capillary tube used in the process according to the present invention, obstructions do not occur, even after long working periods. Besides from the industrial point of view the process does not require very expensive apparatuses having a high shear as above indicated.

The following Examples illustrate the invention but without limiting the scope thereof.

EXAMPLES

Characteriization methods
Distribution of the Particle Diameter (%)

The particle diameter distribution is calculated determining the ratios by weight between the particles having a diameter in the range from 0.7 to 1.3 times the average particle diameter on the total of the particles, and multiplying by 100. The particle diameter is determined by laser scattering using as device the Coulter® LS 230 instrument. The instrument directly gives the distribution curve. From the distribution curve it is possible to directly calculate the weight of the distribution particles having the diameters in the above considered range.

Determination of the Apparent Density

The ASTM D 4895-89 method is used.

Determination of the Average Diameters ($D_{50}$)

The PTFE fine powder is dispersed in water with non ionic surfactant Triton®X100 and the particle diameter is determined by laser scattering using as device the Coulter®LS 230 instrument. The instrument directly gives the distribution curve from which the instrument calculates the $D_{50}$ and the distribution as above reported.

Determination of the Dispersion Density

The dispersion density is calculated as average density from the following formula:

$$\frac{100}{\Sigma \ x/density_{water} + y/density_{PTFE}}$$

wherein:
x=percentage by weight of water in the dispersion,
y=percentage by weight of PTFE in the dispersion.

Viscosity Calculation

The dispersion viscosity is determined by the following formula (Einstein formula):

$$Viscosity_{medium} \times (1+2.5\Phi)$$

wherein the viscosity$_{medium}$ is the water viscosity and $\Phi$=PTFE volumetric concentration in the dispersion.

Example A
Preparation of the PTFE Latex 600 parts by weight of degassed water, 1.33 parts of an aqueous solution of ammonium perfluorooctanoate at 30% w/w in ammonium perfluorooctanoate, 3 parts of an aqueous solution of ammonium persulphate at 0.2 % w/w in ammonium persulphate are fed into a reactor equipped with mechanical stirrer, previously put under vacuum. The reactor is pressurized with TFE up to a pressure of 20 bar (2 MpA) at a temperature of 30° C. Then 3 parts of an aqueous solution of $(NH_4)_2Fe(SO_4)_2 \times 6H_2O$ (Mohr salt) at a concentration of 0.3% by w. are fed.

When the pressure in the reactor has decreased of 0.5 bar ($5 \times 10^4$ Pa) one starts to feed TFE so as to maintain a constant pressure of 20 bar inside the reactor. In the meantime the reactor internal temperature is increased up to 85° C. at a rate equal to 1° C./min. During the reaction 3.5 parts of the above ammonium perfluorooctanoate aqueous solution (surfactant) are fed into the reactor.

After 50 minute from the start, the TFE feeding is stopped, the reactor vented, cooled and lastly discharged. The discharged latex has a concentration of 510 g of PTFE/liter of water.

Example 1

Process according to the present invention by diluting in step
a1) the latex to a concentration of 120 g/l, and using in step
b1) a pressure of 15 bar (1.5 MPa), in step d1) a capillary tube length (diameter 3 mm) of 7 meters The latex obtained as in Example A is diluted in a lift (lift 1) having a 500 liter capacity until obtaining a concentration of 120 g/l (10.7% in solid), the latex is diluted so that the temperature is maintained at 22° C.

After the dilution the lift 1 is pressurized with compressed air at a pressure of 1.5 Mpa related to the atmospheric pressure.

The latex is mixed, in a mixer in-line, with a HNO3 solution at 3% by weight and a latex having a concentration of 110 g/l with pH 2 is obtained, the temperature is 22° C.

No aggregation/gelification of the latex during this last step has been observed.

The latex is let flow through a capillary tube having a diameter of 3 mm, length of 7 meters with a 6.4 m/sec rate. By operating in said way the complete aggregation/gelification of the latex is guaranteed with absence of granules of coagulated polymer (fine powder).

The obtained gel is granulated under mechanical stirring having a specific power of 2.7 KW/M$^3$, until complete granulation and flotation of the fine powder. The wet fine powder is separated from water and dried.

The obtained fine powder has the properties of apparent density, average diameter, and diameter distribution as shown in Table 1.

When the content of lift 1 is ended, the lift 2 is inserted, having the same capacity of lift 1, to have a continuous process.

Example 2

Process according to the present invention by diluting in step a1) the latex to a concentration of 120 g/l, and using in step b1) a pressure of 10 bar (1 MPa), in step d1) a capillary tube length (diameter 3 mm) of 7 meters One operates as in Example 1, but with the following changes.

The latex obtained in Example A is diluted in a lift having a 500 liter capacity until obtaining a concentration of 120 g/l (10.7% in solid), the latex is diluted at the temperature of 22° C.

After the latex dilution, the lift is pressurized with compressed air at 1 Mpa related to the atmospheric pressure.

The latex is mixed, in a mixer in-line, with a HNO3 solution at 3% obtaining a latex having a concentration of 110 g/l with pH 2, the temperature is 22° C. Under said conditions there is no latex gelification.

The latex is then let flow in a capillary tube having a diameter of 3 mm, length of 7 meters with a 5 m/sec rate. By operating in said way the complete gelification of the latex is guaranteed with absence of granules of coagulated polymer (fine powder).

The obtained gel is granulated under mechanical stirring with a specific power of 2.5 KW/m$^3$, until complete granulation and flotation of the fine powder. The wet fine powder is separated from water and dried.

The obtained fine powder has the properties of apparent density, average diameter, and diameter distribution as shown in Table 1.

Example 3

Process according to the present invention by diluting in step
a1) the latex to a concentration of 80 g/l, and using in step
b1) a pressure of 15 bar (1.5 MPa), in step d1) a capillary tube length (diameter 3 mm) of 19 meters
One operates as in Example 1, but with the following changes.

The latex obtained as in Example A is diluted in a lift having a 500 liter capacity to a concentration of 80 g/l (7.4% in solid), the dilution is carried out at the constant temperature of 22° C.

After the dilution, the lift is pressurized with compressed air at a pressure of 1.5 Mpa related to the atmospheric pressure.

The latex is mixed, in a mixer in-line, with a HNO$_3$ solution at 3% by weight so that a latex having a concentration of 75 g/l with pH 2.5 is obtained, at the temperature of 22° C. Under said conditions there is no latex gelification.

The latex is then let flow through a capillary tube having a diameter of 3 mm, length of 19 meters with a 4 m/sec rate. By operating in said way the complete gelification of the latex is guaranteed with absence of granules of coagulated polymer (fine powder).

The obtained gel is granulated under mechanical stirring, specific power of 2.2 KW/m$^3$, until complete granulation and flotation of the fine powder. The wet fine powder is separated from water and dried.

The obtained fine powder has the properties of apparent density, average diameter, and diameter distribution as shown in Table 1.

Example 1c (comparative)

Batch process to obtain the fine powder from a PTFE latex according to the prior art without capillary tube In a 50 liter reactor 15 liters of latex of Example A and water are introduced, until obtaining 22 liters of latex having concentration of 160 g/l (13.7% in solid) The latex is diluted so that after dilution the temperature is 22° C.

The mixture is added under stirring with a HNO$_3$ solution at 20% by weight so to bring the latex pH to 2.5.

The mechanical stirring causes the aggregation of the colloidal particles. First there is gelification, then granulation and lastly flotation of the coagulated powder. The obtained fine powder is separated from water and dried.

The obtained fine powder has the properties of apparent density, average diameter and diameter distribution as shown in Table 1.

A powder having an apparent density lower than 470 g/l and a distribution of the particle diameters lower than 50% is obtained.

Example 2c (comparative)

Continuous process according to U.S. Pat. No. 3,046,263

One operates as in Example 1, but with the following changes.

The latex obtained in Example A is diluted until obtaining a concentration of 120 g/l (10.7% in solid). The latex is diluted so that the final temperature after dilution is 22° C. The mixture is added under stirring with a HNO$_3$ solution at 20% by weight so to bring the latex pH to 2.5.

The latex is fed to the capillary tube (diameter 3 mm, length 7 m), by using a centrifugal pump. By operating in this way the pump and the capillary tube become obstructed and it is not possible to proceed further.

TABLE 1

Concentration of the diluted latex, relative pressure in the lift, pH after dilution in the mixer with a HNO$_3$ solution, pH and capillary tube length and corresponding properties of the obtained fine powders: apparent density, average diameter (D$_{50}$) and % by weight in the powders of the particles having a diameter from 0.7 to 1.3 times the average diameter of the powder particles

| Ex. | Latex conc. after dil. g/liter | Relative pressure (bar) | pH | Capillary tube length (m) | Apparent density (Kg/m$^3$) | D$_{50}$ (μm) | Particle distribution % by weight |
|---|---|---|---|---|---|---|---|
| 1 | 120 | 15 | 2 | 7 | 510 | 420 | 65 |
| 2 | 120 | 10 | 2 | 7 | 480 | 470 | 60 |
| 3 | 80 | 15 | 2.5 | 19 | 520 | 500 | 68 |
| 1c comp | 160 | — | 2.5 | — | 410 | 470 | 45 |
| 2c comp | 120 | — | 2.5 | 7 | — | — | — |

What is claimed is:
1. A continuous coagulation process of PTFE or modified PTFE fine powders, comprising:
a1) dilution in a lift of a PTFE latex obtained from the polymerization in dispersion (emulsion) to a concentration from 5 to 25% w/w of PTFE, or modified PTFE; and optional filtration of the obtained diluted latex;
b1) latex pressurization in the lift by an inert gas, up to a relative pressure, referred to the atmospheric pressure, in the range 3–40 kg/cm$^2$ (0.3–4 MPa);
c1) addition of an acid electrolyte solution, to the PTFE latex, in a in-line mixer, so that the pH is from 1 to 4;

d1) latex flowing from the mixer through a capillary tube under turbulent flow conditions, having a Reynolds number higher than 3,000;

e1) granulation (coagulation) of the gel obtained in step d1) by mechanical stirring with a specific power from 1.5 to 10 kW/m$^3$, maintaining the stirring until fine powder flotation;

f1) separation of the underlying water from the fine powder.

2. A process according to claim 1, wherein to obtain turbulent flow conditions of the latex, in the step d1) one works as follows:

the total capillary tube hydraulic resistance under the process conditions causes a pressure fall between the capillary tube ends from 3 to 40 kg/cm$^2$(0.3–4 MPa);

the capillary tube length is from 0.1 to 30 m;

the latex/gels rate inside the capillary tube is in the range 2–15 m/sec;

the capillary tube diameter being from 2 to 20 mm.

3. A process according to claim 1, wherein the TFE copolymers contain one or more comonomers, of hydrogenated and/or fluorinated type, having at least one unsaturation of ethylene type in an amount from 0 to 3% by moles.

4. A process according to claim 3, wherein the hydrogenated comonomers are selected from ethylene, propylene, acrylic monomers.

5. A process according to claim 3, wherein the fluorinated comonomers are selected from the following:

$C_3$–$C_8$ perfluoroolefins;

$C_2$–$C_8$, hydrogenated fluoroolefins, selected from a group consisting of vinyl fluoride (VF), vinylidene fluoride (VDF), trifluoroethylene, hexafluoroisobutene and perfluoroalkyl-ethylene $CH_2=CH-R_f$, wherein $R_f$ is a $C_1$–$C_6$ perfluoroalkyl;

$C_2$–$C_8$ chloro- and/or bromo- and/or iodo-fluoroolefins;

(per)fluoroalkylvinylethers (PAVE) $CF_2=CFOR_f$, wherein $R_f$ is a $C_1$–$C_6$;

(per)fluorooxyalkylvinylethers $CF_2=CFOX$, wherein X is a $C_1$–$C_{12}$ alkyl, a $C_1$–$C_{12}$ oxyalkyl, or a $C_1$–$C_{12}$ (per)fluorooxyalkyl having one or more ether groups;

fluorodioxoles;

non-conjugated dienes of the type:

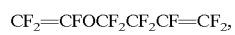

$CF_2=CFOCF_2CF_2CF=CF_2$,

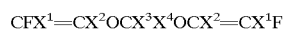

$CFX^1=CX^2OCX^3X^4OCX^2=CX^1F$ wherein $X^1$ and $X^2$, equal to or different from each other, are F, Cl or H; $X^3$ and $X^4$, equal to or different from each other, are F or $CF_3$, which during the polymerization cyclopolymerize;

fluorovinylethers (MOVE) of general formula:

$CFX_{AI}=CX_{AI}OCF_2OR_{AI}$ (A-I) wherein $R_{AI}$ is a $C_2$–$C_6$ linear, branched or $C_5$–$C_6$ cyclic (per) fluoroalkyl group, or a $C_2$–$C_6$ linear, branched (per) fluorooxyalkyl group, containing from one to three oxygen atoms; when $R_{AI}$ is a fluoroalkyl or a fluorooxyalkyl group as above it can contain from 1 to 2 atoms, equal or different, selected from the following: H, Cl, Br, I; $X_{AI}=F$, H; the compounds of general formula:

$CFX_{AI}=CX_{AI}OCF_2OCF_2CF_2Y_{AI}$ (A-II), wherein $Y_{AI}=F, OCF_3$.

6. Non thermoprocessable fine powders of PTFE or modified PTFE obtainable by the process of claim 1, having:

apparent density, $\geq 470$ g/l, average diameter ($D_{50}$) higher than 200 micron, distribution of the particle diameters, defined as ratio between the weight of the particles having a diameter from 0.7 to 1.3 times with respect to the average particle diameter and the total weight of the particles higher than 50%.

7. A process according to claim 1, wherein the inert gas of point b1) is air, the acid electrolyte solution of point c1) is nitric acid, and the Reynolds number of point d1) is higher than 5,000.

8. A process according to claim 4, wherein the acrylic monomers are selected from a group consisting of methyl methacrylate, (meth)acrylic acid, butylacrylate, and hydroxyethylhexylacrylate.

9. A process according to claim 5, wherein the $C_3$–$C_8$ perfluoroolefin is hexafluoropropene (HFP);

the $C_2$–$C_8$ chloro-fluoroolefin is chlorotrifluoroethylene (CTFE);

the PAVE monomer contains (per)fluoroalkyl $R_f$ groups selected from a group consisting of $CF_3$, $C_2F_5$, and $C_3F_7$;

the (per)fluorooxyalkylvinylether $CF_2=CFOX$, wherein X is perfluoro-2-propoxy propyl;

the fluorodioxoles are perfluorodioxoles; and the fluorovinylethers (MOVE) are (MOVE I) $CF_2=CFOCF_2OCF_3CF_3$ (A-III) or (MOVE II) $CF_2=CFOCF_2OCF_2OCF_3$ (A-IV).

10. Fine powders of PTFE or modified PTFE according to claim 6, wherein the average diameter ($D_{50}$) is from 400 to 600 micron, and the distribution of the particle diameters id higher than or equal to 60%.

* * * * *